United States Patent [19]

Hauschild

[11] 4,008,065
[45] Feb. 15, 1977

[54] GRANULATED FERTILIZER COMPOSITION AND METHOD FOR ITS PREPARATION

[75] Inventor: Ulrich Hauschild, Hannover, Germany

[73] Assignee: Kali-Chemie Aktiengesellschaft, Hannover, Germany

[22] Filed: Feb. 14, 1975

[21] Appl. No.: 550,158

[30] Foreign Application Priority Data

Feb. 16, 1974 Germany .......................... 2407491

[52] U.S. Cl. .................... 71/34; 71/64 E; 71/64 DA; 71/DIG. 1; 423/306; 423/315
[51] Int. Cl.² .......................................... C05B 7/00
[58] Field of Search ...... 71/34, 64 E, 64 F, 64 DA, 71/DIG. 1, 43; 423/305, 306, 315

[56] References Cited

UNITED STATES PATENTS

| | | | |
|---|---|---|---|
| 3,409,393 | 11/1968 | Stahlheber | 71/64 E X |
| 3,708,275 | 1/1973 | Camp, Jr. | 71/34 X |
| 3,776,713 | 12/1973 | Quanquin et al. | 71/64 DA |
| 3,852,055 | 12/1974 | Hawkes et al. | 71/64 E X |
| R25,455 | 10/1963 | Lobdell | 71/34 X |

*Primary Examiner*—Frank A. Spear, Jr.
*Assistant Examiner*—Ferris H. Lander
*Attorney, Agent, or Firm*—Bacon & Thomas

[57] ABSTRACT

Disclosed is a granulated fertilizer composition comprising mineral phosphates calcined with alkali and between about 0.5 and 15% by weight of tetrapotassium pyrophosphate as an adjuvant. Also disclosed is a process for preparing the subject compositions.

13 Claims, No Drawings

GRANULATED FERTILIZER COMPOSITION AND METHOD FOR ITS PREPARATION

BACKGROUND OF THE INVENTION

The present invention relates to granulated fertilizer compositions as well as to a method for preparing same, and more especially, to granulated fertilizer compositions based upon alkali-containing calcined phosphates, i.e. mineral phosphates calcined with alkali, containing tetrapotassium pyrophosphate as an adjuvant resulting in improved properties of the composition.

Many proposals have already been made for the granulation of finely divided, ground fertilizer phosphates, either alone or in combination with other fertilizer components. In connection with the so-called build-up granulation method carried out on granulizing trays, in rotating drums or the like, water or steam is typically introduced since the dry substances do not permit the formation of compact granules without moisture. In order to fully comply with the various requirements which are placed upon the granular compositions in practice, additional substances are frequently added to the compositions as adjuvants.

Numerous substances are described in the literature as granulating adjuvants and/or binding agents for fertilizer compositions (see, for example, "Uebersicht In Aufbereitungstechnik", 1971, page 677). In addition to water soluble materials, such as sodium carbonate, sulfite waste liquor, sugar, molasses, calcium chloride (German Auslegeschrift No. 1,153,036), magnesium sulfate, magnesium chloride (German Patent No. 1,258,878), and urea, swellable viscose solutions or products capable of forming suspensions, such as starch, water glass, cellulose ether, alginate, synthetic resins, gum arabic, dextrine, and vinyl resins (German Offenlegungsschrift No. 2,023,502) are mentioned above all. Also, mineral acids are said to be effective (German Offenlegungsschriftten No. 1,767,781 and No. 1,592,754), and in addition, there are mentioned compounds insoluble or difficultly soluble in water, such as clay, bentonite, gypsum, calcium hydroxide, industrial dusts (German Offenlegunsschrift No. 2,060,927), bitumen, tar, wax, or substances capable of reacting with one another, such as magnesium oxide MgO and magnesium chloride $MgCl_2$, or water glass and calcium chloride.

It is not possible to put forth a completely general rule in connection with the addition of adjuvants, since the effectiveness is most often strongly dependent upon the nature and/or composition of the fertilizer material. In addition the pH value and other factors, which shall not be gone into any further at this point, also play a role.

The relationship between adjuvant and fertilizer is especially complicated when water-insoluble or difficulty soluble fertilizer become involved. To this category belong, for example, the alkali-containing products prepared in a calcining process from naturally occurring calcium phosphates. They are generally considerably more difficultly and imperfectly granulizable than the water soluble fertilizer phosphates. While some of the above-mentioned proposals and/or methods in the case of calcined phosphates (also with mixtures thereof with other nutritive carriers) lead to fine-grained, apparently good granules, nevertheless, one or more of the mechanical properties of the granules are more or less unsatisfactory, or the granulation yield is poor. Moreover, combinations of different methods do not bring any significant improvement.

SUMMARY OF THE INVENTION

It is therefore an object of the present invention to provide an improved fertilizer composition.

Another object of the present invention resides in the provision of an improved fertilizer composition containing an improved and more effective granulating adjuvant.

It is also an object of the present invention to provide a fertilizer composition containing said improved adjuvant which is characterized by not suffering from a loss of $P_2O_5$ solubility.

Yet another object of the present invention resides in the provision of an improved granulated fertilizer composition characterized by strong, abrasion-resistant particles which nonetheless decompose rapidly upon application.

It is also an object of the present invention to provide a process for producing the foregoing improved granulated fertilizer compositions.

A further object of the present invention resides in the provision of a process for producing granulated fertilizer compositions wherein a high percentage of the yield falls within the desired granule size range.

In accomplishing the foregoing objects, there has been provided in accordance with the present invention a granulated fertilizer composition comprising mineral phosphates calcined with alkali and between about 0.5 and 15%, preferably between about 1 and 10% by weight of tetrapotassium pyrophosphate $K_4P_2O_7$. The granulated fertilizer composition, preferably having a particle size between about 0.5 and 3 mm., may also contain other plant nutritive agents of conventional type, for example, potassium salts, magnesium salts, and/or nitrogen compounds, as well as one or more other conventional fertilizer granulating adjuvants and/or binding agents, such as those set forth hereinabove.

In another aspect of the present invention, there has been provided a process for the preparation of the aforementioned granulated fertilizer composition. The process comprise the steps of mixing together ground alkali-containing calcined phosphate and between about 0.5 and 15%, preferably between about 1 and 10% by weight of tetrapotassium pyrophosphate $K_4P_2O_7$, granulating the resulting mixture with water, typically between about 7 and 15% thereof, and drying the resulting granules, typically at a temperature between 105° and 200° C. In carrying out the process, preferably at least about 85% of the ground calcined phosphate has a particle size smaller than 0.15 mm and comprises compounds having a molar ratio of $P_2O_5 : Me_2O : CaO = 1 : 0.9$ to $1.6 : 3.0$ to $4.1$ ($Me_2O = Na_2O$ or $K_2O$); or of $P_2O_5 : Na_2O : CaO = 1 : 0.2$ to $1.1 : 2.0$ to $3.1$. Also, the calcined phosphate may contain one or more additional known plant nutritive agents, and/or one or more other conventional fertilizer granulating adjuvants during the mixing step.

Further objects, features and advantages of the present invention will become apparent from the following detailed description of several specific embodiments of the invention.

DETAILED DESCRIPTION OF SPECIFIC EMBODIMENTS

The present invention is based upon the surprising discovery that quite outstanding granulated products may be produced from alkali-containing calcined phosphates, either alone or in combination with other fertilizer agents, e.g., with potassium salt, if in addition to water, tetrapotassium pyrophosphate $K_4P_2O_7$ is also present as an adjuvant during the granulation procedure. The effectiveness of tetrapotassium pyrophosphate is entirely specific. Along with the excellent granulizing effect, there results simultaneously other properties which favorably influence the end product. The granules which are formed, the so-called "green" granules, dry in higher yield to hard, non-abradable, but at the same time, porous particles, which possess a granule size range which is advantageous for agricultural purposes. Furthermore, the particulate products fulfill the expectations of the consumer, since on the one hand, they hardly tend to dust formation, and on the other hand, after application they quickly decompose from the moisture in the ground.

The amount of tetrapotassium pyrophosphate in the end product typically falls within the range of between about 0.5 and 15% by weight. Preferably, about 1 to 10% by weight of the pyrophosphate is added. On the other hand, it is of little importance whether the pyrophosphate is mixed with the product to be granulized in the form of powder or in some other form, for example, as an aqueous solution.

Conventional apparatus can be used for the granulation of the calcined phosphates and/or mixtures thereof with other nutritive substance carriers. For example, there may be employed mixing screws, granulation drums, granulation trays, etc. Depending upon the formulation of the mixture, typically between about 7 and 15% by weight of water is required in addition to the tetrapotassium pyrophosphate in order to produce the desired granule sizes. It is often advantageous if the calcined phosphate is introduced into the granulation step in finely ground condition, for example, 85% finer than 0.15 mm.

For drying of the moist granules, both directly or indirectly heated drums, bands, or troughs as well as fluidized bed granulators or other drying facilities are suitable. During drying, the granules should be heated to a temperature above about 105° C., for example, between 105° C. and 200° C.

Over 65% of the dried granules, and frequently greater than 90% thereof, fall within the granule size range between about 0.5 and 3 mm. The oversized granules can be broken up and sieved, whereas the undersized granules can be directed back again to the granulation stage. In this manner, the total yield of the sought-after granule sizes amounts most often to considerably greater than 80%.

As nutritive substance carriers which can be mixed with the subject calcined phosphates, there may be considered, for example, the naturally occurring potassium salts, such as potassium chloride or potassium sulfate or magnesium salts such as kieserite ($MgSO_4 \cdot H_2O$). In addition, highly concentrated nitrogen compounds, such as urea, are also usable. It is also to be understood that small amounts of boron as well as the trace elements which are also important for plant growth may be included in the composition in the form of various compounds. Mixtures of these additional plant nutritive agents may also be incorporated in the granulated fertilizer composition.

In the case of tetrapotassium pyrophosphate, the product to be granulated does not require, as is the case in connection with most other proposed granulating adjuvants, the addition of an inert or filler substance. Instead, a substance may be used which consists of 100% of pure plant nutritive agents. As a result of good water solubility, these nutritive agents are available immediately in the ground, and because of this, there result totally interesting plant-physiological aspects having many possibilities for variation, e.g., also for specialty fertilizers. This is especially true, because it is well known of the alkali-containing calcined phosphates that the components contained therein possess a true depot effect, i.e., they hold their activity over a long period of time, so long as they are not required by the plants.

During the granulation process, the $P_2O_5$ solubility of the calcined phosphates often decreases in conjunction with the conventional test solutions. This process is more or less intensely promoted by the previously used granulating adjuvants. Contrarywise, with the use of tetrapotassium pyrophosphate as the granulating adjuvant, a reduction in $P_2O_5$ solubility is not produced. The originally present $P_2O_5$ solubility remains constant; the $P_2O_5$ added with the pyrophosphate is also not bound in the form of an immobile compound.

The tetrapotassium pyrophosphate may be used not only alone, but also in combination with one or more of the previously known adjuvants. The maximum effectiveness on a case-by-case basis is determinative of the proportional distribution of the substances. Accordingly, the tetrapotassium pyrophosphate can, for example, be combined with one or more of the following materials: sulfite waste liquor, sugar, starch, molasses, water glass, gypsum, clay, natural or synthetic water soluble polymers. In this manner, it is possible to replace a portion of the pyrophosphate with other effective but less expensive materials.

In the case of e.g. carbohydrates like starch, molasses, sulfite waste, it is e.g. possible to replace 20 to 70% of the tetrapotassium pyrophosphate by said adjuvants considering their dry weight.

The following examples are presented to more completely describe the present invention, it being understood that the examples are intended to be merely illustrative and in no sense limitative.

EXAMPLE 1

1000 parts of ground alkali-containing calcined phosphate (Rhenaniaphat having 29.2% $P_2O_5$, 17.6% $Na_2O$, 38.6% CaO and a $P_2O_5$ solubility in Petermann solution of 98.1%) is mixed with 80 parts of $K_4P_2O_7$, and the admixture is mixed in a rotating mixer-granulator with water (approximately 11%) for a period of time sufficient to form moist granules. The "green" granules which fall predominantly in the range between 0.5 and 2.5 mm., are next dried up to a temperature of 160° C. in a drying drum which is directly heated with gases. After cooling, the mechanical and analytical fuel investigations are performed. The results are summarized in the following Table:

|  | Example 1 | Without $K_4P_2O_7$ Addition |
|---|---|---|
| Yield in granule size range of 0.5–2.5 mm. | 90.2% | 32% |
| Total yield after breaking and sieving of oversize granules | 92% | 35% |
| Average breaking limit of 50 granules | 1.39 kp | 0.25 kp |
| Abrasion after 10 falls from 10 m. height, <0.5 mm. | 2.4% | 14% |
| Decomposition of the granules in water after 2 minutes | 100% | 10% |
| Total $P_2O_5$ content | 30.2% | 29.1% |
| $P_2O_5$ solubility in Petermann-solution | 99.2% | 96.7% |
| $P_2O_5$ solubility in Water | 11.4% | 0.9% |
| $K_2O$ content | 4.3% | 0.1% |

The product flows freely and developes practically no dust.

EXAMPLES 2 and 3

Two different mixtures of the alkali-containing calcined phosphate utilized in Example 1 and potash salt (comprising predominantly potassium chloride) are mixed with the amounts of $K_4P_2O_7$ specified below, and the mixtures are granulated with water in the identical fashion as in example 1. Subsequently, the granules are dried and cooled in a manner analogous to example 1. The essential data and analysis results are set forth in the following Table:

| Example No. | 2 | | 3 | |
|---|---|---|---|---|
| Mixture | Content of $P_2O_5$=17.8% $K_2O$ = 19.2% | | Content of $P_2O_5$=14.8% $K_2O$ = 24.6% | |
| $K_4P_2O_7$ Addition | 3.1% | None | 2.7% | None |
| Granules, dry granule size 0.5–2.5 mm. | 81% | 34% | 82% | 33% |
| Breaking limit | 1.13 kp | 0.31 kp | 0.89 kp | 0.28 kp |
| Abrasion | 3.6% | 18% | 3.6% | 22% |
| Decomposition in water | 100% | 80% | 100% | 85% |
| Total $P_2O_5$ | 18.5% | 17.8% | 15.5% | 14.8% |
| Petermann-solubility | 99.1% | 97.9% | 99.1% | 97.8% |
| $P_2O_5$ Water solubility | 7.7% | 0.9% | 8.1% | 0.9% |
| $K_2O$ Content | 20.6% | 19.2% | 25.2% | 24.6% |

Mixtures with only 0.5% $K_4P_2O_7$ addition still lead to clearly better results than in the case of no $K_4P_2O_7$ addition. The granulated material obtained with the addition of $K_4P_2O_7$ permits of easy handling, is well adapted for storage and develops practically no dust.

COMPARATIVE EXAMPLE

The procedure of Examples 2 and 3 is repeated, except that 1% by weight Wheat starch is used instead of $K_4P_2O_7$. The data and analysis results are set forth in the following table:

| Starch Addition: | 1% |
|---|---|
| Granules, dried: | |
| Size range 0.5 – 2.5 mm: | 67% |
| Breaking limit | 0.42 kp |
| Abrasion | 13% |
| Decomposition in Water | 20% |
| Total-$P_2O_5$: | 15.2% |
| Petermann-Solubility: | 98.0% |
| $P_2O_5$-Water solubility | 0.9% |
| $K_2O$-Content | 25.1% |

EXAMPLES 4 THROUGH 6

In these examples, a ground calcined potassium phosphate is employed which is produced in a calcining process from raw phosphate, potassium hydroxide solution and sand, and has 26.5% $P_2O_5$, 23.4% $K_2O$ and a $P_2O_5$ solubility in Petermann solution of 97.8%. To one sample of 1000 parts of this phosphate is added 50 parts of $K_4P_2O_7$, and to a second sample of 1000 parts by weight is added 100 parts by weight of $K_4P_2O_7$. The mixtures are granulated with water in the manner described in example 1 and are subsequently dried in the same manner as in example 1.

In example 6, a mixture of the calcined potassium phosphate and potash salt is employed having a total of 20.1% $P_2O_5$ and 30.3% $K_2O$.

The results of investigating the compositions according to this example are set forth in the following Table:

| Example No. | 4 | 5 | Comparative | 6 |
|---|---|---|---|---|
| $K_4P_2O_7$-Addition | 5% | 10% | none | 3.8% to the mixture |
| Granules, dry Granule size 0.5 – 2.5 mm. | 82% | 97% | 48% | 89% |

-continued

| Example No. | 4 | 5 | Comparative | 6 |
|---|---|---|---|---|
| $K_4P_2O_7$-Addition | 5% | 10% | none | 3.8% to the mixture |
| Breaking limit | 1.06 kp | 2.48 kp | 0.31 kp | 1.06 kp |
| Abrasion | 3.2% | 0.9% | 8.1% | 3.8% |
| Decomposition in Water | 100% | 100% | 0% | 100% |
| Total $P_2O_5$ | 27.2% | 27.9% | 26.5% | 21.7% |
| Petermann-solubility | 98.1% | 98.5% | 96.1% | 99.8% |
| $P_2O_5$-Water solubility | 8.3% | 14.7% | 0.9% | 8.3% |
| $K_2O$-Content | 25.0% | 26.4% | 23.4% | 31.2% |

The products obtained according to the examples are free of dust and permit of good handling and storage.

COMPARATIVE EXAMPLE

The procedure of Examples 4–6 is repeated except that 1% by weight of cellulose pitch (residue from evaporated sulfite waste liquor) is used instead of $K_4P_2O_7$. The following table sets forth the data and results of analysis for the resulting product.

| Mixture: Contents: $P_2O_5$ = 26.2%, Starch = 1% | $K_2O$ = 23.2%, |
|---|---|
| Granules, dried: | |
| Size range 0.5 – 2.5 mm: | 65% |
| Breaking limit | 0.42 kp |
| Abrasion | 5.2% |
| Decomposition in water | 10% |
| Total-$P_2O_5$ | 26.2% |
| Petermann-solubility | 96.5% |
| $P_2O_{5\text{-water solubility}}$ | 0.9% |
| $K_2O$-Content | 23.2% |

EXAMPLE 7

The procedure of Example 3 is repeated, except that the calcined phosphate/potassium salt mixture is mixed with a combination of $K_4P_2O_7$ and potato starch instead of only $K_4P_2O_7$. The mixture is characterized by the following contents:

| Raw material mixture : | Content of $P_2O_5$ | = | 14.8% |
|---|---|---|---|
| | Content of $K_2O$ | = | 24.6% |
| Addition of $K_4P_2O_7$ | | | 1.3% |
| Addition of Potato starch | | | 0.4% | the freely flowing granulated product produced after drying and cooling is characterized by the following parameters:

| Granule size 0.5–2.5 mm | 79% |
|---|---|
| Breaking limit | 1.04 kp |
| Abrasion | 3.0% |
| Decomposition in water | 100% |
| Total $P_2O_5$ | 15.1% |
| Petermann-Solubility | 99.1% |
| $P_2O_5$ Water Solubility | 4.5% |
| $K_2O$ | 25.0% |

There results negligibly poorer mechanical data than in the case of the product in Example 3.

What is claimed is:

1. A granulated fertilizer composition comprising mineral phosphates calcined with alkali and between about 0.5 and 15% by weight of tetrapotassium pyrophosphate $K_4P_2O_7$.
2. The granulated fertilizer composition as defined by claim 1, wherein said amount of $K_4P_2O_7$ is between about 1 and 10% by weight.
3. The granulated fertilizer composition as defined by claim 1, further comprising at least one additional plant nutritive agent selected from the group consisting of potassium salts, magnesium salts, nitrogen compounds, boron compounds and mixtures thereof.
4. The granulated fertilizer composition as defined by claim 1, further comprising an amount of a fertilizer adjuvant selected from the group consisting of sulfite waste liquor, starch, molasses, sugar, water glass, gypsum, clay, natural or synthetic water-soluble polymers and mixtures thereof.
5. The granulated fertilizer composition as defined by claim 1, having a particle size between about 0.5 and 3.0 mm.
6. A process for the preparation of the granulated fertilizer composition defined by claim 1 comprising the steps of mixing together ground alkali-containing calcined phosphate and between about 0.5 and 15% by weight of tetrapotassium pyrophosphate $K_4P_2O_7$, granulating the resulting mixture with water and drying the resulting granules.
7. The process as defined by claim 6, wherein at least about 85% of said ground calcined phosphate has a particle size smaller than 0.15 mm.
8. The process as defined by claim 6, wherein between about 1 and 10% by weight of said $K_4P_2O_7$ is mixed with said calcined phosphate.
9. The process as defined by claim 6, wherein said mixture is granulated with between about 7 and 15% water.
10. The process as defined by claim 6, wherein said calcined phosphate contains an additional plant nutritive agent selected from the group consisting of potassium salts, magnesium salts, nitrogen compounds, boron compounds and mixtures thereof.
11. The process as defined by claim 6, further comprising adding to said mixture a minor amount of a fertilizer granulating adjuvant selected from the group consisting of sulfite waste liquor, sugar, starch, molasses, water glass, gypsum, clay, natural or synthetic water-soluble polymers and mixtures thereof.
12. The process as defined by claim 6, wherein said $K_4P_2O_7$ is added in the form of a powder.
13. The process as defined by claim 6, wherein said $K_4P_2O_7$ is added in the form of an aqueous solution.

* * * * *